United States Patent
Ruch et al.

(10) Patent No.: US 12,036,633 B2
(45) Date of Patent: Jul. 16, 2024

(54) PRESSING TOOL WITH SAFETY ELEMENT

(71) Applicant: Von ARX AG, Sissach (CH)

(72) Inventors: Matthias Ruch, Efringen-Kirchen (DE); Rudolf Kreuzer, Buchs (CH)

(73) Assignee: Emerson Professional Tools AG, Sissach (CH)

( * ) Notice: Subject to any disclaimer, the term of this patent is extended or adjusted under 35 U.S.C. 154(b) by 1250 days.

(21) Appl. No.: 16/685,285

(22) Filed: Nov. 15, 2019

(65) Prior Publication Data

US 2020/0180092 A1    Jun. 11, 2020

(30) Foreign Application Priority Data

Dec. 7, 2018   (EP) .................................... 18211095

(51) Int. Cl.
| | | |
|---|---|---|
| B25B 27/02 | (2006.01) | |
| B21D 39/04 | (2006.01) | |
| B23Q 5/58 | (2006.01) | |
| B25B 27/10 | (2006.01) | |
| B25F 5/02 | (2006.01) | |
| F16P 3/00 | (2006.01) | |

(52) U.S. Cl.
CPC .............. *B23Q 5/58* (2013.01); *B21D 39/04* (2013.01); *B25B 27/026* (2013.01); *B25B 27/10* (2013.01); *B25F 5/02* (2013.01); *F16P 3/005* (2013.01); *B23Q 2240/007* (2013.01)

(58) Field of Classification Search
CPC .............................. B21D 39/04; B25B 27/026
See application file for complete search history.

(56) References Cited

U.S. PATENT DOCUMENTS

| | | |
|---|---|---|
| 5,040,400 A | 8/1991 | Nastasi |
| 5,611,228 A | 3/1997 | Dummermuth |
| 6,510,719 B2 | 1/2003 | Goop |

(Continued)

FOREIGN PATENT DOCUMENTS

| | | |
|---|---|---|
| CN | 1516638 A | 7/2004 |
| CN | 102 829 037 A | 12/2012 |
| CN | 102 829 038 A | 12/2012 |

(Continued)

OTHER PUBLICATIONS

CN Office Action and Search Report dated Jan. 27, 2021; Application No. CN201911244334.2; 5 pages.

(Continued)

*Primary Examiner* — Teresa M Ekiert
(74) *Attorney, Agent, or Firm* — Mark Bandy; Rankin Hill & Clark, LLP (57) ABSTRACT

A pressing tool for plastically deforming a workpiece is described. The pressing tool includes a housing and an electric motor for actuating the pressing tool. The pressing tool also includes an instrument seat which is adapted to receive an interchangeable instrument head at the housing. The pressing tool also includes a mechanical safety element which is arranged in a manner that is movable from an open position, in which an instrument head may be inserted into the instrument seat, into a closed position, in which the instrument head is locked in the instrument seat. The pressing tool additionally includes a mechanical actuating element which may interact with the safety element in order to be able to cause the pressing tool to be enabled for a pressing process.

12 Claims, 4 Drawing Sheets

(56) References Cited

U.S. PATENT DOCUMENTS

2002/0148274 A1 10/2002 Goop
2012/0284981 A1 11/2012 Bungter et al.

FOREIGN PATENT DOCUMENTS

| EP | 0 712 696 A1 | 5/1996 |
| EP | 2 501 523 A1 | 9/2012 |
| GB | 1 559 966 A | 1/1980 |
| WO | WO 2012132858 A1 | 10/2012 |

OTHER PUBLICATIONS

European Search Report dated Jul. 19, 2019; Application No. 18211095.7; 7 pages.
CN Office Action and Search Report dated Oct. 24, 2022.; Application No. CN2021112139388.

PRESSING TOOL WITH SAFETY ELEMENT

FIELD

The present invention relates to a pressing tool for plastically deforming a workpiece with a safety apparatus which only allows an actuation of the pressing tool if an instrument head is correctly inserted into the instrument seat of the tool.

BACKGROUND

Several methods of joining tubular workpieces are known in the prior art. One of these methods puts a larger pipe over a smaller pipe and presses the two pipes against each other. In a different method, pipes are joined together by pressing compression fittings. To make the connection possible, hand-held pressing tools which are also referred to as pipe pressing tools are used. Such hand-held pressing tools have a pressing instrument with interchangeable instrument heads which may be exchanged for different processing methods such as pressing, crimping or cutting workpieces, for example. In pressing tools for joining pipes together by means of a compression fitting, the pressing jaws of the instrument head surround the compression fitting arranged around the pipe. By closing the pressing jaws, the compression fitting and the pipe are plastically deformed and, thus, permanently joined together.

Usually, the pressing tools are driven by an electric motor and actuate the instrument head via a hydraulic piston or a purely electromechanical drive. For this purpose, the pressing tools have an electric motor in both cases which may be operated by the electricity grid or in battery mode. For the purpose of generating the required high pressing forces, an electro-hydraulic or electromechanical converter is usually arranged between the electric motor and the instrument head. The electric motor generates a rotary motion which is geared-down by a transmission connected to the electric motor, for example. The drive shaft of the transmission, in turn, drives an eccentric of an eccentric shaft, for example. In a hydraulic converter, a piston of a piston pump is moved backwards and forwards by the driven eccentric and, thus, a hydraulic fluid is guided to a cylinder space. By means of the hydraulic fluid conveyed by the piston pump, a servo piston within the pressurized cylinder is moved linearly in the direction of the instrument head.

From document EP 2 501 523 B1, a manually guided press device for connecting a press fitting in installation engineering and for pressing cables lugs is known. For the purpose of generating the required high pressing forces, the pressing instrument is connected to an electro-hydraulic converter. A brushed or brushless electric motor is used as a drive motor. As soon as the required pressing force is reached, a mechanical relief valve opens and the motor speed surges. This is recognized by the control of the press device, and the electric motor is subsequently switched off. Hence, this device provides a safety apparatus which acts at the end of a pressing process.

Due to the high forces involved, it is of great importance that the pressing tool may only be triggered when the interchangeable instrument head or pressing jaw is correctly inserted into the instrument seat of the pressing tool. An instrument head that is not correctly inserted may result in damage to the tool or the instrument when the pressing tool is actuated and additionally poses a safety risk to the user.

Hence, the problem underlying the invention is to provide a pressing tool which is equipped with a safety element in order to ensure that an interchangeable instrument head is correctly held and/or locked in the instrument seat of the tool. In another aspect, the invention is to provide a means with which it is possible to prevent the pressing tool from being triggered as long as it is not ensured that the instrument head is correctly arranged in the instrument seat.

SUMMARY

The difficulties and drawbacks associated with previous approaches are addressed in the present subject matter as follows.

In one aspect, the present invention provides a pressing tool for plastically deforming a workpiece. The pressing tool comprises a housing and an electric motor for actuating the pressing tool. The pressing tool also comprises an instrument seat which is adapted to receive an interchangeable instrument head at the housing. The pressing tool additionally comprises a mechanical safety element which is arranged in a manner that is movable from an open position, in which the instrument head may be inserted into the instrument seat, into a closed position, in which the instrument head is locked in the instrument seat. The pressing tool also comprises a mechanical actuating element which is arranged at the instrument seat in a manner that is movable between a first position and a second position. The actuating element is arranged in such a way that it may interact with the mechanical safety element, so that the safety element forces the actuating element into the second position in its closed position.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

In particular, the aforementioned problems are solved by a pressing tool for plastically deforming a workpiece, comprising a housing and an electric motor for actuating the pressing tool, an instrument seat which is arranged at the housing for accepting an interchangeable instrument head, and a mechanical safety element which is arranged in a manner that is movable from an open position, in which an instrument head may be inserted into the instrument seat, into a closed position, in which the instrument head is locked in the instrument seat. Furthermore, the pressing tool comprises a mechanical actuating element which is adapted at the pressing tool in a manner that is movable between a first position and a second position, wherein the actuating element is adapted in such a manner that it may interact with the mechanical safety element, so that the safety element forces the actuating element into the second position in its closed position.

The pressing tool in accordance with the invention has an electric drive and may be driven electro-hydraulically or electromechanically, for example. Typically, the pressing tool is a hand-held pressing tool, that means, it is not a fixed tool but is held in the hands by the user during the processing of workpieces. The actual tool is provided in the form of an interchangeable instrument head. The attachments usually used for such pressing tools may be considered as instruments, such as pressing jaws, crimping instruments or cutting and punching instruments, in particular. Providing an interchangeable instrument head makes the pressing tool universally applicable as it may be equipped with instruments respectively suitable for the various applications. Therefore, the instrument seat and the instrument head are preferably adapted in such a manner that a fast exchange of the instrument head by the user is possible, for example at a construction site. Particularly preferably, the instrument head is designed in such a manner that it may be exchanged without any tool, i.e. purely manually, by the user.

The instrument head must be safely received by the instrument seat in order to prevent malfunctions of the tool. For this purpose, a mechanical safety element is provided which locks the instrument head in the instrument seat. The element may be moved from an open position, which allows the instrument head to be inserted into the seat, into a closed position, in which the instrument head is locked in the instrument seat. The instrument head and instrument seat are adapted in such a manner that the safety element may only be moved into the second position if the instrument head is correctly inserted. If the safety element is a bolt, for example, it may only be inserted into a seat and be moved from the open to the closed position if the instrument head is completely and correctly held in the seat.

The mechanical actuating element is adapted to interact with the safety element. In this context, it is particularly squeezed into a certain (second) position by the safety element when the safety element is moved into its closed position. Here, the movement of the actuating element by the safety element may already begin when the safety element is moved from the open position into the closed position, so before it ultimately reaches it. At any rate, when the safety element is in the closed position, it forces the actuating element into a certain, second position, preferably directly in a mechanical manner. The movement of the actuating element from the first into the second position may be detected by suitable means which will be described below, which makes it possible to determine whether the instrument head is locked in the instrument seat. This knowledge may then be used to enable the pressing tool for a pressing process. If the mechanical safety element is not in the closed position, it does not force the actuating element into the latter's second position either, and enabling the pressing tool for a pressing process may be prevented. Hence, actuating the pressing tool is only possible if the safety element is in its closed position. This may also be the case if no instrument head is inserted into the instrument seat, for example. Rather, if an instrument head is inserted, what is essential is that it is completely and correctly inserted before an enabling of the pressing tool for a pressing process takes place.

Preferably, the actuating element makes it possible in its second position to enable the pressing tool for a pressing process. In this context, enabling the pressing tool may take place directly or indirectly by the actuating element by the actuating element actuating a sensor, or a switch, or the like, for example. This ensures that no pressing process may be triggered if the safety element is not in its closed position. Since the safety element may only be brought into its closed position if the instrument head is correctly held in the instrument seat and/or if no instrument head is present, this ensures that a pressing process is not unintentionally triggered if an instrument head is not correctly inserted. This is because, in case of an instrument head that is not correctly inserted, the triggering of a pressing process may result in damage to the instrument, the workpiece or even in injuries to the user.

Preferably, the housing of the pressing tool is equipped with a sensor which causes the enabling upon the triggering, with the actuating element triggering the sensor in its second position. The term sensor is understood in its broadest sense possible herein and may comprise any kind of components which may interact with the actuating element in order to effect an action which causes the pressing tool to be enabled for a pressing process. For example, the sensor may an optical switch which detects when the actuating element is in its second position. The detection may then be used to convey a corresponding signal to a control of the pressing tool, so that it allows the tool to be enabled for a pressing process. This advantageously ensures that a pressing process may only be triggered if the actuating element is in its second position and, thus, the safety element is in its closed position. While the actuating element is arranged at the instrument seat (that, preferably, is rotatable), the sensor is provided and/or arranged at the housing. This makes it possible to eliminate a fixed wiring from the instrument seat to the housing which is indispensable if the sensor is arranged at the instrument seat.

Preferably, the instrument seat is arranged at the housing of the pressing tool in a rotatable manner, preferably freely rotatable without any restrictions. For many practical applications, it is desirable that the instrument seat and, thus, the instrument head, is held in a rotatable manner in relation to the housing of the pressing tool. For example, in many situations of application, the space for positioning the pressing tool by the user is confined. For example, when pipes are to be joined together along a wall, often, it is not possible to freely use the pressing tool; instead, only the use in one certain orientation is possible. In case of a rigid instrument head, this may result in the fact that certain pipe connections are not feasible. An unrestricted, freely rotatable arrangement of the instrument seat relative to the housing of the pressing tool, allows for a rotation of the instrument seat and the instrument head within by 360° in both potential rotation directions, for example. This advantageously provides a particularly high flexibility of the handling of the tool. From prior art, electronic actuating elements were known which detected whether the safety element is in its closed position. The electronic actuating elements use a sensor, which recognizes the position of the safety element, and signal lines, with which the signals of the sensor are carried to the control of the pressing tool. For this purpose, it is necessary that the signal lines lead from the instrument seat to the housing of the pressing tool where the control of the pressing tool is located. Such constructions have the great disadvantage that a rotatability of the instrument seat relative to the housing of the pressing tool is impeded due to the signal lines which extend from the instrument seat to the housing. A rotation of the instrument seat always also causes the signal lines to move in the same direction, which means that they are a weak spot of the design due to the frequent strain. Thus, in such tools from prior art, what regularly happens is that the signal lines are damaged or cut off when the instrument seat is rotated relative to the housing of the pressing tool. In particular, configuring a freely rotatable instrument seat is not possible with such solutions. Therefore, the solutions according to prior art usually only allow for a restricted rotatability, for example by 90° or less in each rotation direction. Now, the present invention allows the actuating element to be rotated together with the instrument seat as a fixed connection between the actuating element and the housing of the pressing tool, as is compulsory in case of signal lines (cables), for example, because they necessarily have to extend from the instrument seat to the housing, is no longer necessary. To put it differently, the present invention makes it possible to only mechanically attach the actuating element to the instrument seat without the necessity of it having to have any fixed connection to the housing and/or the base body.

Preferably, the instrument seat is adapted to be rotatable relative to the housing of the pressing tool, preferably freely rotatable without any restrictions, and coupled to the housing of the pressing tool via a rotary joint. Additionally, the actuating element preferably comprises a circular element which surrounds the instrument seat, and the circular element is arranged in such a manner that it causes the sensor to be triggered when the actuating element is in its second position. The instrument seat and, thus, the actuating element attached thereto, are rotatable relative to the housing of the pressing tool and the circular element surrounds the instrument seat, preferably entirely, i.e. it is a continuous circle which surrounds the instrument seat by 360°. However, it is also conceivable that the circular element only partially surrounds the instrument seat or is formed from multiple elements. Rather, what is essential is that the circular element allows that it is possible to trigger a sensor independently from the orientation of the instrument seat and, thus, of the actuating element, relative to the pressing tool. The use of such a surrounding circular element allows that only one or two sensors have to be provided at the housing of the pressing tool, for example, as the circular element allows an actuation of said sensors independently of the orientation of rotation of the tool seat and/or actuating element.

Preferably, the actuating element comprises a rod which extends from the closed position of the safety element along the instrument seat to the rotary joint. One end of the rod is then located at and/or close to the closed position of the safety element, for example, so that it may interact with the safety element. The other end of the rod is close to the rotary joint and, therefore, allows a triggering and/or actuation of a sensor provided at the housing of the pressing tool which, preferably, should also be located close to the rotary joint for this purpose. A rod is a sturdy and reliable mechanical solution which performs reliably and durably even in tough every-day use.

Preferably, the housing of the pressing tool is equipped with a sensor and/or a sensor is arranged at the housing, which sensor causes the tool to be enabled when being actuated or triggered, and the actuating element is adapted in such a manner that it actuates said sensor when the actuating element is in its second position. In this context, the actuating element does not necessarily have to actuate the sensor directly, but any form of indirect actuation is conceivable as well.

Preferably, (at least) one sensor is provided at the housing of the pressing tool which causes an enablement when being triggered and the actuating element triggers the sensor in its second position and the sensor is a mechanical switch, an optical sensor or a capacitive sensor. For example, an optical sensor may detect the position of the actuating element and determine when it is in its second position. The detection may trigger a signal which is carried to the control of the pressing tool, for example, in order to cause the pressing tool to be enabled for a pressing process. Particularly preferably, the sensor is a mechanical switch. This solution is particularly robust and not very prone to failure. When in its second position, the actuating element triggers the mechanical switch by directly interacting with it in a mechanical manner, for example. Hence, in the context of the aforementioned circular element of the actuating element in particular, it is possible that one single switch which is adapted at the housing in a fixed manner suffices because an actuation of the single switch by means of the circular element is possible, independently of the orientation of rotation in which the instrument seat and the attachment element held at it are arranged with respect to the housing. Generally, using more than one sensor and more than one actuating element or more than one safety element, should this be desired, is equally possible, of course. This only increases the effort in terms of construction without any deviation from the conception of the invention.

Further preferably, the sensor is a mechanical switch which is equipped with a movable spring leg, at the free end of which a rotatable wheel is arranged, which wheel engages with the actuating element when the actuating element is in the second position. On the one hand, the wheel allows a wear-free actuation of the switch, even in case of very frequent actuation processes; on the other hand, such a wheel is particularly advantageous if the actuating element has a circular element which surrounds the instrument seat in order to allow an actuation of the switch independently of the orientation of rotation of the instrument seat. For example, the rotatable wheel may constantly be in contact with such a circular element, independently of the position of the actuating element. Only when the actuating element is forced into its second position is the switch triggered. Such a solution is especially wear-free and provides a long operating life of the safety apparatus.

Preferably, the actuating element is preloaded in the first position such as particularly by means of a spring element. If no external forces act upon the actuating element, it, therefore, always is in its first position. Only when the safety element is moved into its closed position does an interaction with the actuating element take place and is the latter moved into its second position against the force of the preloading means. This advantageously ensures that an enabling of the tool does not take place unintentionally because the actuating element is moved into its second position unintentionally without the safety element being in its closed position.

Preferably, the instrument seat has a forked shape. A forked embodiment allows a particularly safe guide and attachment of the instrument head which is typically inserted between the two fork prongs. The safety element preferably is a bolt, particularly if the instrument seat has a forked shape. A bolt is able to safely connect the instrument head with the instrument seat and be embodied sturdy enough to force the mechanical actuating element into the second position when the bolt is moved into its closed position and/or is in its closed position.

Preferably, the forked instrument seat has two openings opposite to each other and the bolt is guided in them. Hence, the bolt extends from one fork prong to the other one and, therefore, is able to lock the instrument head in the fork when in its closed position. This is a sturdy possibility that is simple in terms of construction of safely holding an instrument head and ensuring an interaction with the mechanical actuating element when the safety element is in its closed position.

Preferably, the pressing tool is an electro-hydraulic pressing tool wherein a hydraulic piston actuates the instrument head. In this context, the actuation of the instrument head may be achieved directly or indirectly via the hydraulic piston. Particularly preferably, a roller mechanism is provided at the actuating end of the hydraulic piston which mechanism interacts with actuation surfaces of the instrument head which are accordingly designed and which mechanism allows a movement of the instruments of the instrument head when the hydraulic piston is moved forward.

Generally, it is preferred that the pressing tool has a pressing tool control which causes the pressing tool to be enabled for a pressing process when the actuating element is in its second position. For example, this may take place by the actuating element actuating and/or triggering a sensor in its second position, as described above, which sensor, in turn, is connected to the pressing tool control in order to supply the control with a corresponding signal. This construction has the advantage that the pressing tool control and the sensor may both be provided at or in the housing of the pressing tool, whereas the actuating element is movably arranged at the instrument seat which, in turn, is preferably arranged rotatably with respect to the housing. In this way, the actuating element may rotate in combination with the instrument seat, whereas the sensor is fixed relative to the housing and, thus, relative to the pressing tool control. Hence, signal wiring between the sensor and the control may easily be realized as both elements are in a fixed arrangement with respect to each other. In this manner, a simple rotatability of the instrument seat relative to the housing of the pressing tool may advantageously be achieved, particularly a free rotatability in any desired rotation direction and by any desired angular degree.

Below, preferred embodiments of the present invention will be described in detail with reference to the enclosed figures.

Figure 1:
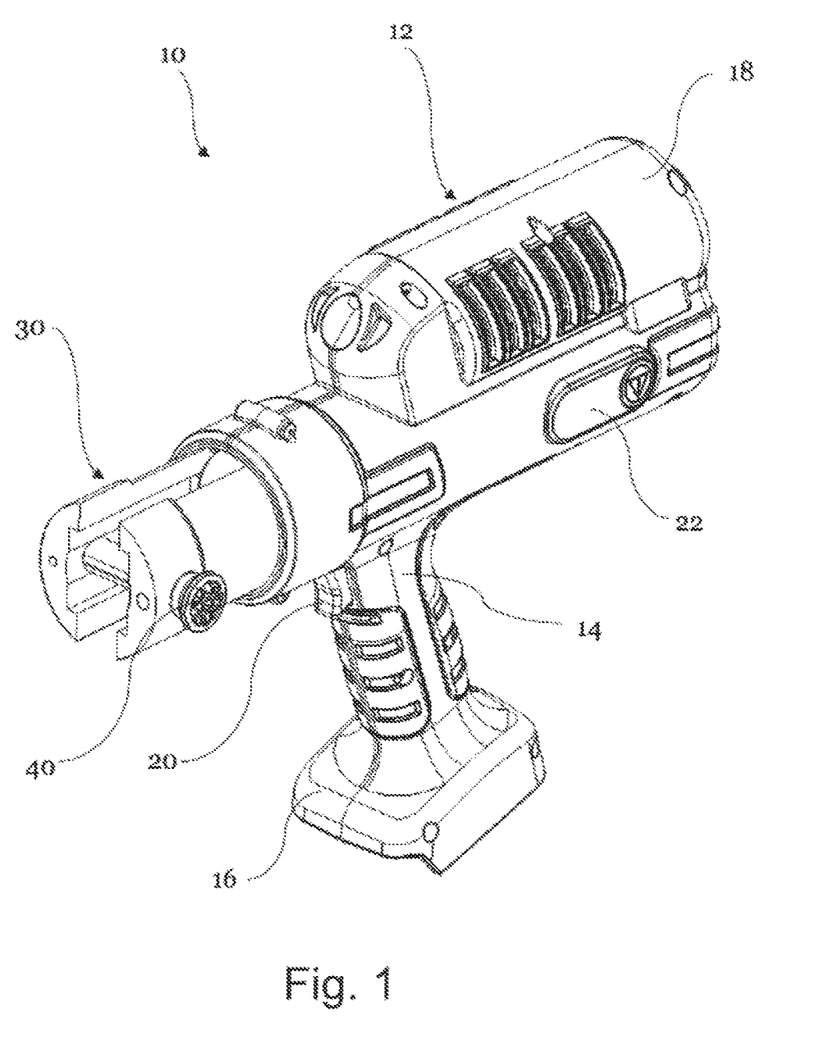
FIG. 1 shows a pressing tool for plastically deforming a workpiece.

FIG. 1 shows an embodiment of a pressing tool 10. The pressing tool 10 is a hand-held pressing tool driven electro-hydraulically. For this purpose, it comprises a handle 14 ("pistol grip") as well as a trigger 20, so that the tool may be operated with one hand. At the end of the handle 14, a socket 16 for an accumulator (not shown) is provided. This allows a wireless operation of the pressing tool 10. The pressing tool 10 has a housing 12 which surrounds and protects the functional components. At the housing 12, an instrument seat 30 that may be moved in a rotatable manner is provided which is adapted to receive an interchangeable instrument head. The instrument seat 30 has a forked shape and allows receiving of an instrument head between the two fork prongs. For the purpose of locking the instrument head in the instrument seat 30, a safety element 40 in the form of a bolt is provided. The housing 12 also contains an electric motor which is indicated by the reference number 18 and a control means 22 which controls the operation of the tool. Particularly, the control means 22 is connected to the trigger 20, so that an actuation of the trigger 20 may trigger a pressing process.

Figure 2:
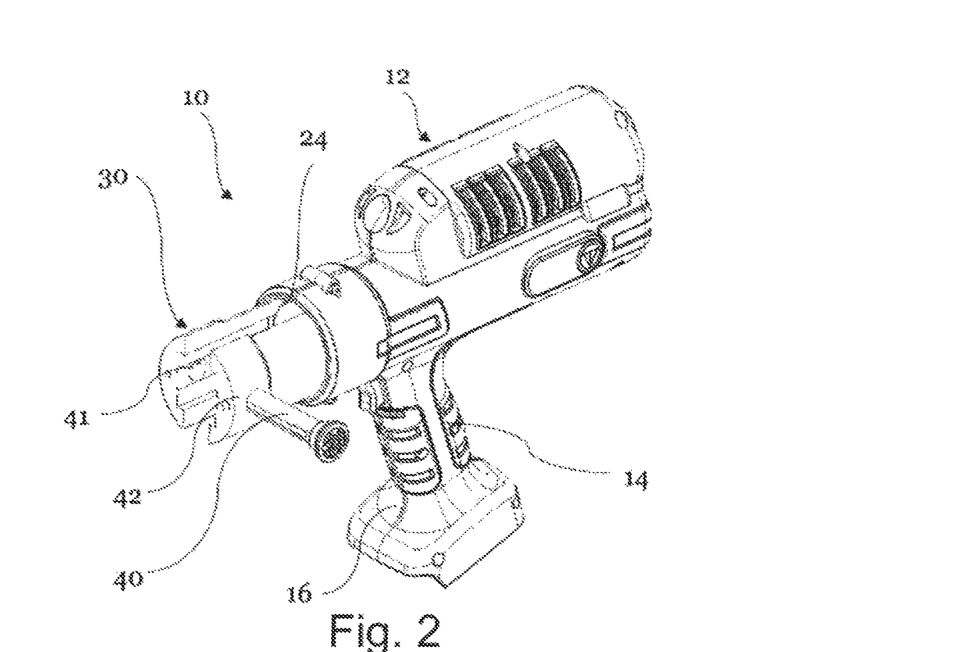
FIG. 2 shows the pressing tool of FIG. 1, wherein a safety element is shown in its open position.

FIG. 2 shows the pressing tool 10 of FIG. 1 when the safety element 40 is in its open position. In the open position, the gap between the two fork prongs of the instrument seat 30 is ready for the insertion of an instrument head. From FIGS. 1 and 2, it can easily be gathered how the safety element 40 is guided in two openings 41, 42 of the forked instrument seat 40 opposite to each other.

Figure 3:
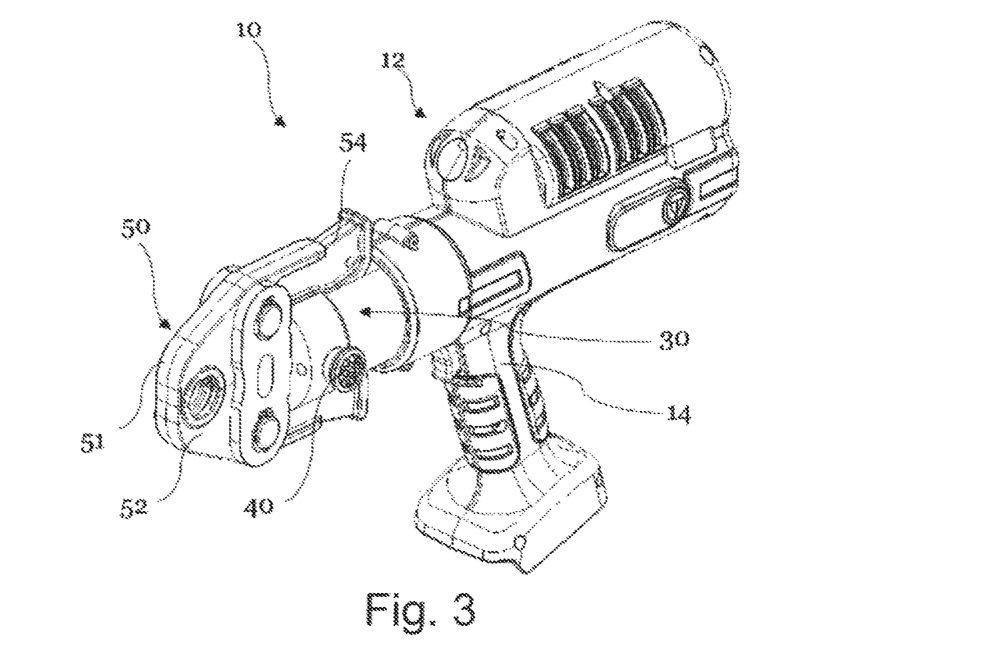
FIG. 3 shows the pressing tool according to FIG. 1 with an inserted and locked instrument head.

FIG. 3 shows the pressing tool with an inserted and locked instrument head 50. The instrument head 50 comprises two movable clamping jaws 51 and 52 between which a fitting for joining pipes together may be inserted and compressed. The safety element 40 is shown in the closed position and locks the instrument head 50 in the instrument seat 30. When a pressing process is triggered, the electric motor 18 drives a hydraulic pump (not shown) which, in turn, moves a hydraulic piston 26 forward from the housing in the direction of the safety element 40 (see FIG. 4). The hydraulic piston 26 is provided with rollers 24 at its free end, which rollers come into contact with actuating elements 54 of the instrument head 50 and, thus, cause the clamping jaws 51 and 52 to close when the hydraulic piston is moved forward. For a safe operation of the pressing tool, it is necessary for the instrument head 50 to be safely held in the instrument seat. For this purpose, the safety element 40 may be moved into the closed position in which it locks the instrument head in the seat. Furthermore, the present invention provides a mechanical actuating element which may interact with the safety element 40.

Figure 4:
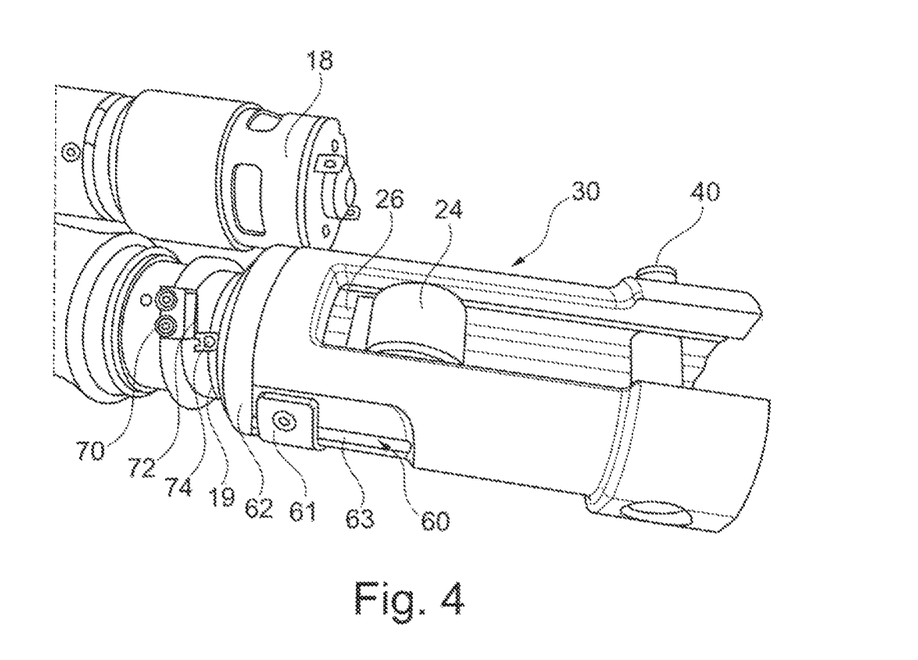
FIG. 4 shows a detailed view of the instrument seat of the pressing tool of FIG. 1.

The operating principle of the mechanical actuating element will be explained below with reference to FIGS. 4 through 6. In FIG. 4, a detailed view of the instrument seat is shown, wherein parts of the housing were removed for the sake of clarity. The mechanical actuating element 60 comprises a metal pole and/or rod 63 which extends from the bore 41 in the instrument seat 30 to a rotary joint 19 by means of which the instrument seat is mounted at the pressing tool and/or the housing of the pressing tool in a rotatable manner. Hence, the mechanical actuating element 60 extends from the second position of the safety element 40 along the instrument seat to the rotary joint 19. The pole and/or rod 63 is held in a guide 61 and equipped with a circular element 62 at its end facing towards the housing (see FIGS. 4, 5 and 6). The circular element 62 completely surrounds the instrument seat 30 in the shown embodiment, but it may also have a separated design, be composed of multiple parts or only partially surround the instrument seat. On the side of the housing, a sensor in the form of a mechanical switch 70 is provided. The mechanical switch 70 is attached on the side of the housing and does not rotate when the instrument seat rotates. The mechanical switch has a movable spring leg 72 at the end of which a rotatable wheel 74 is arranged. In the assembly shown in FIG. 4, the safety element 40 is in the closed position and squeezes the actuating element 60 into the second position. The circular element 62 is in contact with the wheel 74 and actuates the spring leg 72 in the assembly shown, so that the sensor 70 is actuated and/or triggered and provides a corresponding signal to the control of the pressing tool.

Figure 5:
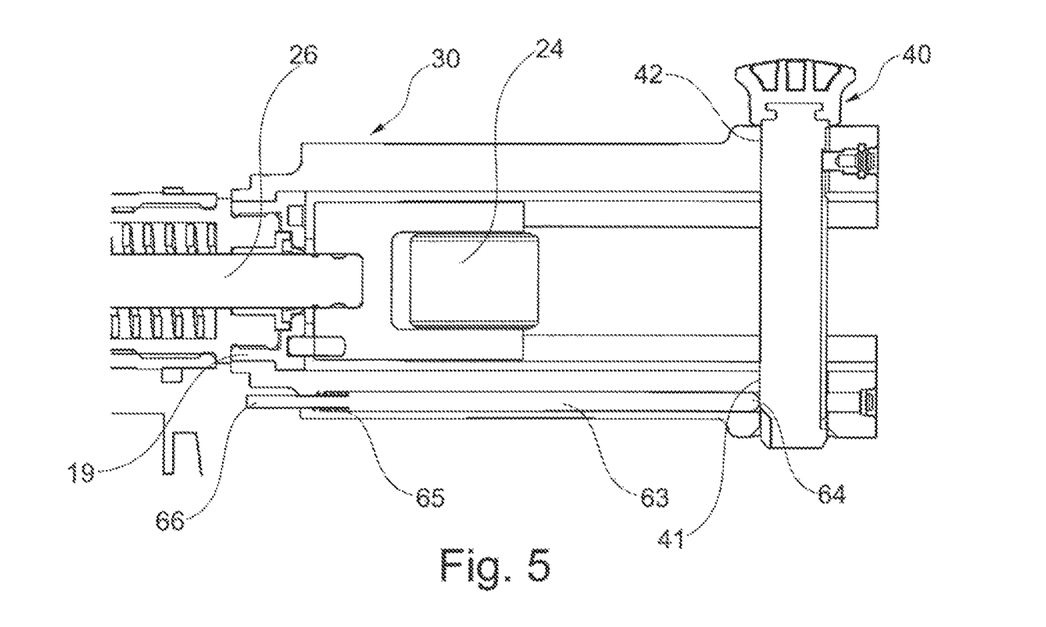
FIG. 5 shows a further detailed view of the instrument seat with an actuating element according to the invention.

In FIG. 5, a partially sectional side view of the detail of FIG. 4 is shown. One can see the hydraulic piston 26 which is connected to the rollers 24 and may move them forward in the direction of the safety element 40 and, thus, in the direction of the instrument head. The safety element 40 is shown in the closed position, wherein no instrument head is inserted in FIG. 5. The pole 63 of the actuating element 60 was moved into the second position by the safety element 40. The left right arrow in FIG. 5 indicates how the pole 63 is arranged at the instrument seat in a movable manner and, thus, may be moved between two positions. A spring element 65 preloads the pole 63 into the first position. In the first position, part of the tip 64 of the pole 63 extends into the opening 42 for receiving the safety element 40. When the safety element 40 is inserted into the opening 42, i.e. when the safety element is moved into the closed position, it mechanically pushes the pole 63 to the left in FIG. 5 against the force of the spring element 65. In this process, the end 66 of the pole 63 is moved in the direction of the housing. The circular element 62 that is not shown in FIG. 5 is permanently connected to the end 66 of the pole 63 and, therefore, is also moved towards the housing. The sensor provided at the housing in the form of the mechanical switch 70 is activated and/or triggered by this movement and sends a corresponding signal to the control of the pressing tool. The signal indicates that the safety element 40 is in the closed position and, thus, the pressing tool may be enabled without any danger. It is clear to the person skilled in the art that, instead of the mechanical switch, other types of sensors may also be used by means of which a detection of the motion and/or position of the actuating element 60 is possible.

Figure 6:
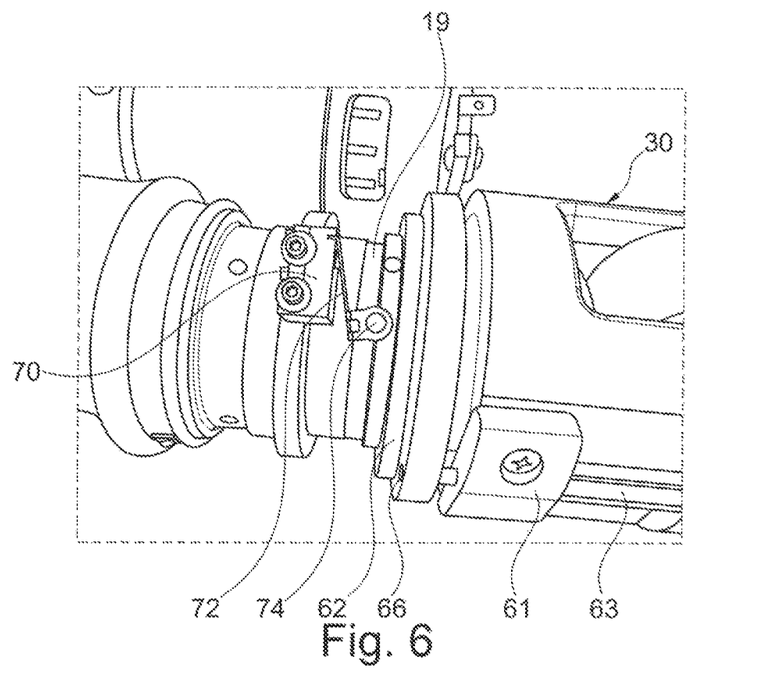
FIG. 6 shows a detailed view of FIG. 4 when the actuating element is in a first position.
Figure 7:
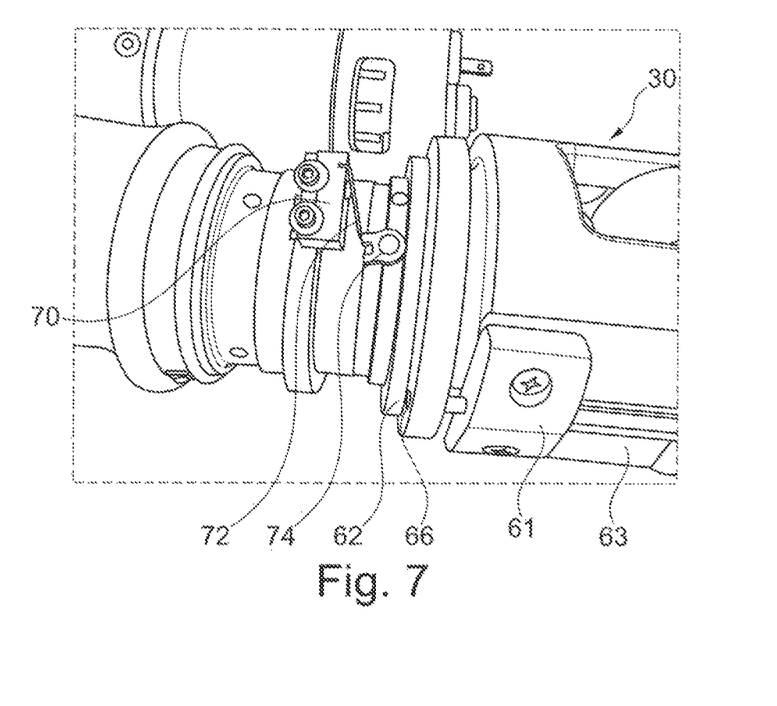
FIG. 7 shows a detailed view of FIG. 4 when the actuating element is in a second position and triggers a sensor.

FIGS. 6 and 7 also show detailed views and, particularly, the interaction between the actuating element 60 and the mechanical switch 70. In FIG. 6, the actuating element is in the first position, i.e. the bolt is not in the closed position. In the assembly shown in FIG. 7, the bolt and/or the safety element is situated in the closed position and squeezes the pole 63 towards the housing and, thus, squeezes the circular element 62 against the wheel 74 of the spring leg 72 and, in doing so, actuates the switch 70.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

LIST OF REFERENCE NUMBERS

10 Pressing tool
12 Housing
14 Handle
16 Socket for battery
18 Electric motor
20 Trigger
22 Control means
24 Rollers
23 Hydraulic piston
30 Instrument seat
40 Safety element (bolt)
41, 42 Openings
50 Instrument head
51, 52 Clamping jaws
54 Actuating vane
60 Actuating element
61 Guide
62 Circular element
63 Pole
64 Tip of the pole
65 Spring element
66 End of the pole
70 Mechanical switch (sensor)
72 Spring leg
74 Wheel
19 Rotary joint

What is claimed is:

1. A pressing tool for plastically deforming a workpiece, the pressing tool comprising:
a housing and an electric motor for actuating the pressing tool;
a tool receptacle which is adapted to receive an interchangeable instrument head at the housing;
a mechanical safety element which is arranged in a manner that is movable from an open position, in which the instrument head may be inserted into the tool receptacle, into a closed position, in which the instrument head is locked in the tool receptacle;
a mechanical actuating element which is arranged at the tool receptacle in a manner that is movable between a first position and a second position, wherein the actuating element is arranged to interact with the mechanical safety element, so that the safety element forces the actuating element into the second position in its closed position;
wherein
the housing of the pressing tool is provided with at least one sensor which, when triggered, causes the pressing tool to be released for a pressing operation, and wherein the actuating element in its second position triggers the sensor; wherein
the tool receptacle is rotatably arranged on the housing of the pressing tool and is coupled to the housing via a rotary joint, wherein the actuating element comprises a ring element which encloses the tool receptacle, and wherein the ring element is arranged to cause the sensor to be triggered when the actuating element is in its second position.

2. The pressing tool for plastically deforming a workpiece according to claim 1, wherein the tool receptacle is arranged at the housing of the pressing tool in a rotatable manner, so as to be freely rotatable without restriction.

3. The pressing tool for plastically deforming a workpiece according to claim 1, wherein the actuating element comprises a rod and extends from the closed position of the safety element along the tool receptacle to the rotary joint.

4. The pressing tool for plastically deforming a workpiece according to claim 3, wherein the actuating element is preloaded into the first position by means of a spring element.

5. The pressing tool for plastically deforming a workpiece according to claim 1, wherein the sensor is a mechanical switch, an optical sensor or a capacitive sensor.

6. The pressing tool for plastically deforming a workpiece according to claim 1, wherein the sensor is a mechanical switch which is equipped with a movable spring leg, at the free end of which a rotatable wheel is arranged, which wheel engages with the actuating element when the actuating element is in the second position.

7. The pressing tool for plastically deforming a workpiece according to claim 1, wherein the actuating element is preloaded into the first position.

8. The pressing tool for plastically deforming a workpiece according to claim 1, wherein the tool receptacle has a forked shape.

9. The pressing tool for plastically deforming a workpiece according to claim 1, wherein the safety element is a bolt.

10. The pressing tool for plastically deforming a workpiece according claim 9, wherein the bolt is guided in two openings of a forked tool receptacle opposite to each other.

11. The pressing tool for plastically deforming a workpiece according to claim 1, wherein the pressing tool is an electro-hydraulic pressing tool, wherein a hydraulic piston actuates the instrument head.

12. The pressing tool for plastically deforming a workpiece according to claim 1, wherein the pressing tool has a pressing tool control which causes the pressing tool to be enabled for a pressing process when the actuating element is in its second position.

* * * * *